United States Patent [19]
Miller et al.

[11] Patent Number: 5,562,767
[45] Date of Patent: Oct. 8, 1996

[54] MANUFACTURED AGGREGATE COMPOSITE

[75] Inventors: F. MacGregor Miller, Gurnee, Ill.; Timothy J. Roth, Allentown, Pa.; William R. Welliver, Ship Bottom, N.J.; Alexander Mishulovich, Wilmette, Ill.; Mark S. Hudson, Valparaiso, Ind.

[73] Assignee: Air Products and Chemicals, Inc., Allentown, Pa.

[21] Appl. No.: 562,777

[22] Filed: Nov. 27, 1995

[51] Int. Cl.⁶ .......................... C04B 18/06; C04B 18/18; C04B 18/30

[52] U.S. Cl. .................. 106/668; 106/605; 106/608; 106/624; 106/634; 106/671

[58] Field of Search ....................... 106/605, 608, 106/624, 634, 668, 671

[56] References Cited

U.S. PATENT DOCUMENTS 5,342,442  8/1994  Nechvatal et al. .................. 106/409

Primary Examiner—David Brunsman
Attorney, Agent, or Firm—Thomas G. Ryder

[57] ABSTRACT

Manufactured aggregates and/or composites having incorporated therein an asphaltic oxidation product.

16 Claims, No Drawings

5,562,767

MANUFACTURED AGGREGATE COMPOSITE

BACKGROUND OF THE INVENTION

This invention relates to a manufactured aggregate derived from the solid oxidation product of an asphaltic material and, more particularly, to a manufactured aggregate for use in the preparation of hot mix asphalt and related bituminous pavements.

Coal fly ash is a waste material generated in large quantities at coal burning power plants. Considerable effort has been made to find an alternative to disposing this material. Various technologies have been developed as a result. For instance, coal fly ash can be treated to form a variety of structural products. Refer to U.S. Pat. No. 5,342,442 and the references cited therein which relate to the use of sewage sludge and coal fly ash in the formation of light weight aggregates.

However, initial studies indicate that coal burning facilities can be converted to utilize naturally occurring asphalts as an alternative energy source. The solid oxidation products resulting therefrom are compositionally and chemically distinct from the various coal fly ash materials previously generated. As a result, such oxidation products have neither been used nor considered in the formulation of structurally useful materials. Coal fly ash typically contains $SiO_2$, $Al_2O_3$ and $Fe_2O_3$. Coal fly ash is not typically water soluble. The oxidation products employed herein contain essentially no detectable levels of the above compounds normally found in coal fly ash. Furthermore the oxidation products used in this invention are composed 55% or more of magnesium sulfate, which is highly soluble in water.

It is generally desirable to provide an inexpensive aggregate material, particularly one which is manufactured thereby providing the opportunity to tailor properties, for use in conjunction with a bituminous pavement surface, especially one having enhanced performance properties.

Various features and advantages of the present invention will be apparent from this summary and included descriptions of preferred embodiments, and will be readily apparent to those skilled in the art having knowledge of manufactured aggregate materials, as can be used in the construction of bituminous pavements, roadways, and related surfaces. Such objects, features, benefits and advantages will be apparent from the above as taken in conjunction with the accompanying examples, tables, data and all reasonable inferences to be drawn therefrom.

SUMMARY OF THE INVENTION

The present invention is directed to the use of the oxidation product of a naturally occurring asphaltic fuel source in the preparation of an aggregate material. Such an aggregate can be used as part of a bituminous pavement. In particular, and without limiting this invention, the aggregates described herein can be incorporated with a hot mix asphalt for use as a roadway/driving surface.

In part, the present invention is an aggregate composite which can be used with hot mix asphalt. The composite includes (a) a cementitious solid material including (1) a cement present in the range from about 40.0 to about 99.9 percent by weight of the cementitious solid, and (2) a solid oxidation product of naturally occurring asphalt from the Orinoco Belt of Venezuela present in a range from about 0.1 to about 60 percent by weight of the cementitious solid, with the cementitious material hydrated and formed into a nodule having pores resulting from curing of the cementitious material; and (b) an additive material. The additive material can be any one, or a mixture, of alkali silicates, alkali fluosilicates, vinyl acetates, latex emulsions or phenolic resins. The additive material is employed in an amount effective to permit retention of the cementitious solid in the formed nodule. We have found that relatively small quantities of the additive are effective, with amounts as low as 0.1 per cent by weight of the total composite being satisfactory. Due to the fact that the additive is a cost item in the production of the aggregate compositions of this invention, it is preferred to keep their use to a reasonable level, such as, not more than about 5 per cent by weight of the composite. While higher concentrations can be employed and are operative, there does not appear to be an advantage of going above about 5 per cent by weight. Usually we employ less than about 4, and even less than about 3, per cent by weight. At the lower end, we have generally used at least about 1 per cent by weight of the additives.

In preferred embodiments, the oxidation product is obtained from oxidation of an aqueous emulsion of a naturally occurring asphalt from the Orinoco Belt of Venezuela. Such emulsion is commercially available under the trademark, Orimulsion®. Generally such oxidation product is present in the cementitious solid in an amount from about 35 to about 55 percent by weight.

As described above, the inventive aggregate composites have incorporated therein an oxidation product of an aqueous emulsion of a naturally occurring asphalt from the Orinoco Belt of Venezuela. Generally and as will be well known to those skilled in the art made aware of the invention, such an oxidation product can be prepared by contacting the asphalt material with air and/or another oxygen-containing stream, through any one of several recognized processes or variations thereof, to provide the oxidation product in addition to combustion by-products such as heat, carbon dioxide and water. The oxidation product is the solid residual subsequently collected downstream from the point of combustion/oxidation.

The oxidation product of the present invention can be generated in such a manner as to include the introduction of one of several auxiliary processes and/or additives upstream, downstream or at the point of combustion, to meet various process or combustion requirements, relating but not limited to emission control, reduced corrosion or enhanced operability. Depending upon the nature of these additives the combustion residue or by-products thereof can become intimately co-mingled with either the oxidation product described above and can be, where appropriate, considered part of, integral to, and used with the present invention.

Illustrative of an auxiliary process and/or additive is the incorporation of a flue gas cleanup device-such as a wet lime-limestone scrubber——downstream from the combuster. Scrubber residues can be returned and/or reintroduced to the combustion/oxidation line at a point upstream of the final particulate separator, such that the residues are mixed with and incorporated into the oxidation product. Again, considering a scrubber process as illustrative of a number of available auxiliary processes, one skilled in the art will recognize that the identity/composition of the scrubber residues are a function of the identity of the particular scrubbing reagent, whether it be lime, limestone or a related scrubbing reagent, and the compositional components and their relative concentrations of the make-up water used in the scrubber.

An asphaltic precursor to the oxidation product of this invention is commercially available from Bitor America Corporation, Boca Raton, Fla., under the Orimulsion® trademark. Without limitation, this commercial product is currently prepared by initial injection of steam into the asphalt formation until the viscosity is reduced to a point permitting it to flow into a well bore. A primary aqueous emulsion is prepared which further reduces asphalt viscosity and facilitates handling and transportation. The primary emulsion is then broken with the water substantially removed, leaving an asphalt material with less than 2 percent water. Alternatively, the asphalt in the formation can be dissolved or suspended in a light hydrocarbon solvent, such as for example, kerosene, and the kerosene-containing bitumen removed to the surface where separation of the bitumen and kerosene can be effected.

Fresh water is reintroduced and the asphalt is emulsified with a surfactant under strictly controlled protocols. For example, for a shear rate of 20 s$^{-1}$, a viscosity of about 450 mPa is achieved by handling the Orimulsion® at 30° C. This and comparable production methods and techniques provide an aqueous emulsion with no more than 2 percent of the droplets having a diameter higher than 80 micrometers. The Orimulsion® material is further characterized by density (~1,010 Kg/m$^3$ at 15° C.), flash point (~130° C./266° F.), and concentrations of vanadium (~0.300 ppm), nickel (~73 ppm), magnesium (~0.350 ppm), carbon (~60.0 weight percent), hydrogen (~7.5 weight percent), sulfur (~2.7 weight percent), nitrogen (~0.50 weight percent) and oxygen (~0.20 weight percent).

It will be understood by those skilled in the art that the composites and/or aggregates of the present invention are not restricted by incorporation of an oxidation product of any one Orinoco-type asphalt material. Whereas a commercially-available Orinoco asphalt material might be described as a 30 percent aqueous emulsion prepared with a nonionic surfactant, the compositions of the present invention can suitably comprise, consist of, or consist essentially of the oxidation product of such material and/or oxidation products of other Orinoco-type asphalts, emulsified or otherwise processed. Each such oxidation product is compositionally distinguishable, characteristically contrasted, and can be practiced in conjunction with the present invention separate and apart from another. Accordingly, it should be understood that the inventive composites and/or aggregates, as illustratively disclosed herein, can be prepared and/or practiced in the absence of any one oxidation product or species which may or may not be specifically disclosed, referenced or inferred herein, the absence of which may or may not be specifically disclosed, referenced or inferred herein.

While other compositions, mixtures or formulations involving a naturally occurring Orinoco-type asphalt can be used herewith, a useful source of the inventive oxidation product is available under the PCS trademark from the Pure Air division of Air Products and Chemicals, Inc. of Allentown, Pa. As described above, the compositional profile of an oxidation product will reflect any operation and/or additive auxiliary to the asphalt and/or oxidation process. However, any such oxidation product—while compositionally distinguishable, characteristically contrasted, and separately practiced—will to some extent reflect either the absolute or relative vanadium and nickel concentrations characteristic of a naturally occurring asphalt from the Orinoco Belt of Venezuela.

The oxidation product, whether or not derived from an aqueous emulsion, can be used effectively over the weight percent range described above. At amounts under the lower end of the given range, cost effectiveness is compromised by increasing levels of a cementitious material. At concentrations of oxidation product beyond the referenced range, insufficient reaction and/or interaction with the cement component can present leachate concerns. However, improvements in existing technology and processing will serve to increase the effective and beneficial concentration range over which the inventive oxidation products may be employed. As is applicable to other aspects of this invention, various time, temperature and mix parameters, as recognized by those of skill in the art, can be used and/or modified with a given concentration of oxidation product to achieve a desired composite and/or aggregate.

As described above, the aggregate composite also includes an additive material. Preferably, an aqueous silicate solution is used. The silicate composition can be, but is not limited to, an alkali silicate or an alkali fluosilicate. Sodium silicate, sodium metasilicate, and/or sodium fluosilicate can be used with beneficial effect. Alternatively, alone or in combination with a silicate additive, an organic binder material can also be used as an additive. Representative but not exclusive of such binders are vinyl acetate, phenolic resins, and latex emulsions.

In certain embodiments, irrespective of the particular additive material utilized, a coal fly ash material can be included in the composite. Without limiting the invention and without adopting any one theory or mode of operation, it is thought that inclusion of such a coal fly ash can serve to minimize the potential for magnesium and/or sulfate leaching where such a phenomenon is a concern. As will be apparent to those skilled in the art, a variety of coal fly ash materials can be utilized. Illustrative of such materials are the Class F and Class C coal fly ashes, the physical and chemical parameters of which are described in American Society of Testing and Materials (ASTM) standard specification C 618 for their use as mineral admixtures with portland cements. (See Tables A–D, below.) Class F fly ash is normally produced from the burning of anthracite or bituminous coal. Class N is a raw or calcined natural pozzolan-siliceous or siliceous or aluminous material which chemically reacts with calcium hydroxide at ordinary temperatures to form compounds possessing cementitious properties. Such pozzolans can include diatomaceous earths, opaline cherts and shales, tuffs and volcanic ashes or pumicites, any of which may or may not be processed by calcination, and various other materials requiring calcination to induce satisfactory properties, such as various other clays or shales. Class F fly ash also has pozzolanic properties.

TABLE A

| ASTM C 618 Chemical Requirements for Mineral Admixtures | | | |
|---|---|---|---|
| | Mineral Admixture Class | | |
| | N | F | C |
| Silicon dioxide ($SiO_2$) plus aluminum oxide ($Al_2O_3$) plus iron oxide ($Fe_2O_3$), min, % | 70.0 | 70.0 | 50.0 |
| Sulfur trioxide ($SO_3$), max, % | 4.0 | 5.0 | 5.0 |
| Moisture content, max, % | 3.0 | 3.0 | 3.0 |
| Loss on ignition, max, % | 10.0 | 6.0 | 6.0 |

TABLE B

ASTM C 618 Supplementary Optional Chemical Requirements for Mineral Admixtures

|  | Mineral Admixture Class | | |
| --- | --- | --- | --- |
|  | N | F | C |
| Available alkalies, as $Na_2O$, max, % | 1.5 | 1.5 | 1.5 |

Applicable only when specifically required by the purchaser for mineral admixture to be used in concrete containing reactive aggregate and cement to meet a limitation on content of alkalies.

TABLE C

ASTM C 618 Physical Requirements for Mineral Admixtures

|  | Mineral Admixture Class | | |
| --- | --- | --- | --- |
|  | N | F | C |
| Fineness: | | | |
| Amount retained when wet-sieved on 45 μm (No. 325) sieve, max, % | 34 | 34 | 34 |
| Strength activity index: | | | |
| With portland cement, at 7 days, min, percent of control | 75 | 75 | 75 |
| With portland cement, at 28 days, min, percent of control | 75 | 75 | 75 |
| Water requirement, max, percent of control | 115 | 105 | 105 |
| Soundness: | | | |
| Autoclave expansion or contraction, max, % | 0.8 | 0.8 | 0.8 |
| Uniformity requirements: | | | |
| The density and fineness of individual samples shall not vary from the average established by the ten preceding tests, or by all preceding tests if the number is less than ten, by more than: | | | |
| Density, max variation from average, % | 5 | 5 | 5 |
| Percent retained on 45-μm (No. 325), max variation, percentage points from average | 5 | 5 | 5 |

Care should be taken to avoid the retaining of agglomerations of extremely fine material.

The strength-activity index with portland cement is not to be considered a measure of the compressive strength of concrete containing the mineral admixture. The strength activity index with portland cement is determined by an accelerated test, and is intended to evaluate the contribution to be expected from the mineral admixture to the longer strength development of concrete. The weight of mineral admixture specified for the test to determine the strength activity index with portland cement is not considered to be the proportion recommended for the concrete to be used in the work. The optimum amount of mineral admixture for any specific project is determined by the required properties of the concrete and other constituents of the concrete and should be established by testing. Strength activity index with portland cement is a measure of reactivity with a given cement and may vary as to the source of both the fly ash and the cement.

If the mineral admixture will constitute more than 20% by weight of the cementitious material in the project mix design, the test specimens for autoclave expansion shall contain that anticipated percentage. Excessive autoclave expansion is highly significant in cases where water to mineral admixture and cement ratios are low, for example, in block or shotcrete mixes.

Meeting the 7-day or 28-day strength activity index will indicate specification compliance.

TABLE D

ASTM C 618 Supplementary Optional Physical Requirements for Mineral Admixtures

|  | Mineral Admixture Class | | |
| --- | --- | --- | --- |
|  | N | F | C |
| Multiple factor, calculated as the product of loss on ignition and fineness, amount retained when wet-sieved on No. 325 (45-μm) sieve, max, %* | — | 255 | — |
| Increase of drying shrinkage of mortar bars at 28 days, max, difference, in %, over control | 0.03 | 0.03 | 0.03 |
| Uniformity Requirements: | | | |
| In addition, when air-entraining concrete is specified, the quantity of air-entraining agent required to produce an air content of 18.0 vol % of mortar shall not vary from the average established by the ten preceding tests or by all preceding tests if less than ten, by more than, % | 20 | 20 | 20 |
| Reactivity with Cement Alkalies: | | | |
| Reduction of mortar expansion at 14 days, min, % | 75 | — | — |
| Mortar expansion at 14 days, max, % | 0.020 | 0.020 | 0.020 |

*Applicable only for Class F mineral admixtures since the loss on ignition limitations predominate for Class C.

Determination of compliance or noncompliance with the requirement relating to increase in drying shrinkage will be made only at the request of the purchaser.

The indicated tests for reactivity with cement alkalies are optional and alternative requirements to be applied only at the purchaser's request. They need not be requested unless the fly ash or pozzolan is to be used with aggregate that is regarded as deleteriously reactive with alkalies in cement. The test for reduction of mortar expansion may be made using any high-alkali cement in accordance with Test Methods C 311, the section on Reduction of Mortar Expansion, if the portland cement to be used in the work is not known, or is not available at the time the mineral admixture is tested. The test for mortar expansion is preferred over the test for reduction of mortar expansion if the portland cement to be used in the work is known and available. The test for mortar expansion should be performed with each of the cements to be used in the work.

Combinations of various coal fly ash materials can be used to provide an aggregate having a desired compositional make-up. Likewise, a concentration of any one or combination of fly ash materials can be gauged to provide a predetermined compositional make-up and/or to provide a certain degree of leachate control. For example a certain amount of Class C Fly ash can compensate for a corresponding decrease in the content of cement and Class F ash.

While a number of hydraulic cementitious materials can be used to prepare the aggregates and/or composites of this invention, portland cements have been used with good effect. The chemical and physical parameters of various portland cements, which can be used in conjunction with the present invention, are as provided in ASTM standard specification C 150-as provided more fully in a co-pending application entitled "Modified Cement and Concrete Compositions," filed contemporaneously herewith. The tables corresponding to ASTM C 150 of the aforementioned co-pending application and the application, are incorporated herein by reference in their entirety.

While any one of the available portland cements can be used with comparable effect, allowing for obvious modifications owing to differences in chemical composition, as well as chemical/physical properties, Type I portland cement is preferred as a matter of economy and general use/ application. In preferred embodiments, where a coal fly ash material is utilized, a Type I portland cement is present in a range from about 40 to about 50 percent by weight; the oxidation product of an Orimulsion® fuel is present in the range from about 40 to about 50 percent by weight, and the fly ash material—preferrably a Class F coal fly ash—is present in the range from about 0.1 to about 20 percent by weight. Such preferred embodiments can optionally include a sealant material comprising at least one of an alkali silicate solution and an aqueous latex emulsion.

In part, the present invention is a manufactured aggregate which includes (1) a cementitious solid material including cement present in the range from about 40.0 to about 99.9 percent by weight of solids; (2) a solid oxidation product of a naturally occurring asphalt from the Orinoco Belt of Venezuela present in the range from about 0.1 to about 60 percent by weight of solids, the cementitious material hydrated and formed into a porous nodule; and (3) calcium and magnesium silicate hydrates. As described above, preferred embodiments of the manufactured aggregate include an oxidation product of an aqueous emulsion of a naturally occurring asphalt from the Orinoco Belt of Venezuela, in particular, an oxidation product of the commercially available Orimulsion® fuel, which can be present in a range from about 35 to 55 percent by weight. The concentration of oxidation product can be adjusted as described above and as needed to provide a stable aggregate.

The calcium and magnesium silicate hydrates within the aggregate pores are at least in part the reaction products of calcium and magnesium cations, respectively, within the cementitious material and a silicate solution used as a binder. As described more fully above, such silicate binders can include sodium silicate, sodium metasilicate, and sodium fluosilicate. Without adopting any one theory or mode of operation, the precipitated silicate hydrates act to seal the aggregate pores and enhance the mechanical properties of the aggregate. Utilizing a fluosilicate sealant may result in deposition of bridged polysilicate anionic structures which also serve to seal the pores and enhance the mechanical properties of the aggregate. To this effect, a silicate binder having a relatively low sodium oxide to silica ratio is more beneficial. The more silica available for reaction with calcium (or magnesium), the greater percentage of the pores will be sealed and the mechanical properties of the aggregate will be enhanced.

The manufactured aggregate of this invention can also include an organic binder material. Representative materials include, but are not limited to, vinyl acetates, latex emulsions, and phenolic resins.

Likewise, as described in conjunction with the composite of this invention, the manufactured aggregate can include a coal fly ash material present in the range from about 0.1 to about 30 percent by weight. While Class F coal fly ash is preferred, Class C fly ash and a combination of Class F and Class C fly ashes can be utilized. Likewise, as described more fully above, whether or not the manufactured aggregate includes a fly ash material, the cement component of the cementitious solid material can be one of the various portland cements. Preferably, Type I portland cement is used because of its general applicability in a concentration which can vary with the concentration oxidation product, but is preferably about 40 to about 50 percent by weight when a Class F coal fly ash material is utilized in the range from about 0.1 to about 20 percent by weight.

In part, the present invention contemplates use of a manufactured aggregate, as described more fully above, in combination with a bituminous composition for construction of a pavement, roadway and/or driving surface. The bitumen component of such composition can be selected from the group of asphalts, coal tars, coal tar pitches, and asphaltenes, as described more fully in a co-pending application entitled "Bituminous Compositions Having Enhanced Performance Properties," in particular Tables A-D, E and H and the corresponding text—incorporated by reference herein in its entirety.

EXAMPLE OF THE INVENTION

The following nonlimiting examples and data illustrate various aspects and features relating to the aggregates, composites, and combinations of the present invention, including the stability and utility of such aggregates and/or composites, for use in conjunction with or in the preparation of a variety of bituminous compositions.

Example 1

A sample of an oxidation product, in accordance with this invention was analyzed for chemical composition. Elemental metals were determined by flame absorption spectroscopy, compared to standard solutions, after dissolution of the sample in hydrochloric acid. Total sulfur content (as sulfate) was determined by a gravimetric method as more fully described in ASTM standard procedure C 114, after digestion of the sample in hydrogen peroxide and 1:4 (v/v) nitric acid/hydrochloric acid. The insoluble residue of the particular sample analyzed was not identified.

| Chemical Analysis (Wt. %) | | | | | | | | |
| --- | --- | --- | --- | --- | --- | --- | --- | --- |
| S(as $SO_4$) | Mg | V | Ni | Ca | Na | Fe | Mn | Insol. Res. |
| 58.0 | 12.9 | 7.7 | 1.6 | 1.0 | 1.6 | 0.23 | 0.005 | 0.11 |

While the oxidation product of this example was derived from the combustion/oxidation of an aqueous emulsion of an Orinoco asphalt, the oxidation product/component of this invention can include, as more fully described above, various other constituents/residues manifesting one or more processes and/or additives auxiliary to the combustion/ oxidation process-constituents/residues that would be reflected by their analytical profiles. By way of further example and without limiting this invention, depending upon the exact nature of a particular additive or auxiliary process, analysis of the oxidation product can reveal the presence of carbon, as well as altered levels of magnesium, calcium or sodium and/or the presence of one or more additional Group IA or IIA metals.

Example 2

The composites and/or aggregates of the present invention can be prepared in accordance with the following procedure or straightforward scale up modifications thereof: using a standard Hobart mixer, the cement material and an oxidation product were mixed for about 10 seconds to provide a somewhat homogenous mixture. The mixture was turned on slow speed and the dry ingredients were mixed for an additional 30 seconds, at which time an amount of water sufficient to provide the required and predetermined degree of hydration was added over a period of about one minute, with continued slow mixing. After additional of water, the mixture was immediately turned up to medium speed and a binder is added. Mixing is continued for about 1–2 minutes, at medium speed. The mixer is then turned off and the material is nodulized into a desired size and shape—preferably spherical particles averaging about 17 mm in diameter. The nodules are then cured for about 7–28 days, at room temperature and 50% relative humidity.

As described more fully above, a preferred binder material is a sodium silicate solution and/or a latex emulsion. Where a sodium silicate solution is utilized to bind the aggregate and seal any pores therein, it can be alternatively added toward the end of the mixing cycle or sprayed with suitable means onto the particle surface after nodulization. Useful sodium silicate solutions are commercially available from a number of sources, for example, the PQ Company. Sodium metasilicate and sodium fluosilicate sealant materials are likewise commercially available and known to those skilled in the art. Alternatively, a preferred binder material is a latex emulsion, commercially available from Air Products and Chemicals, Inc. under the trademark Airflex®.

Example 3

The aggregates of this example were prepared in accordance with the present invention and, generally, as described above. Mix 1 designates an aggregate comprising 15% hydrated lime, 25% Type I portland cement and 60% (by weight) of an oxidation product of this invention. Aggregate 3 is Mix 1 treated with a commercial sodium silicate binder; generally known as water glass, and commercially available from P.Q. Industries of Valley Forge, Pennsylvania. It is sprayed on at a concentration of 0.2 to 3.5 per cent by weight. Aggregate 4 is Mix 1 treated with a commercial latex emulsion. The Airflex emulsion, which is a vinyl acetate based latex, is also sprayed on at a concentration of 0.3 to 4 per cent by weight. Aggregates 5–7 comprise latex-treated Mix 1 further treated with 1, 2 and 3 coatings, respectively, of a commercially available hot mix asphaltic material to simulate incorporation of the subject aggregates into a pavement composition. (See Table 1, below.)

TABLE 1

| Aggregate | Water Extraction Results | | | | | |
|---|---|---|---|---|---|---|
| | (ml) | O.P.(g) | $SO_4$(g) | $SO_4$(%) | Mg(g) | Mg(%) |
| 1. Mix 1 | 279 | 30.20 | 6.72 | 38.38 | 1.31 | 33.65 |
| 2. Mix 1 | 348 | 37.74 | 7.45 | 34.92 | 1.39 | 28.59 |
| 3. Mix 1 and Sodium Silicate | 358 | 38.74 | 7.45 | 33.14 | 1.38 | 27.20 |
| 4. Mix 1 and Latex | 338 | 36.40 | 7.09 | 33.33 | 1.48 | 31.48 |
| 5. 4 and asphalt (1) | 75 | 18.8 | 3.53 | 32.84 | | |
| 6. 4 and asphalt (2) | 34 | 8.5 | 0.72 | 14.52 | | |
| 7. 4 and asphalt (3) | 37 | 9.3 | 0.87 | 16.07 | | |

Each of the above-described aggregates was tested for soluble sulfate and magnesium by Soxhlet extraction with a volume of water as indicated in Table 1, over a 24-hour period, to simulate accelerated weathering conditions. The oxidation product (O.P.) extracted from each aggregate is shown in Table 1. Given the constituent weight percents of Example 1, the amounts of sulfur (58%, as $SO_4$) and magnesium (12.9%) were determined as described in Example 1 and calculated as a percentage of the total sulfur (as $SO_4$) and magnesium levels. For instance, approximately one-third of the available $SO_4$ and Mg were extracted for Aggregates 1–4, irrespective of the presence and/or identity of a binder component. Treating Aggregate 4 with 1, 2 and 3 coatings of asphalt decreased leachability, as observed with Aggregates 5, 6 and 7, respectively.

Example 4

The aggregates of this example were prepared in accordance with the present invention, to minimize sulfate and magnesium leachability, and for the purpose of comparison with the aggregate of Example 3. Aggregate 1 was prepared using equal amounts of Type I portland cement and an oxidation product of this invention. Aggregate 2 is mixed to treat it with 3 per cent by weight of a commercial sodium silicate binder (37.5% by weight solids, Type N from P Q Company) $SiO_2/NaO_2$ ratio=3.3. Aggregate 3 mix includes 1.5 per cent of a commercial latex emulsion (Airflex RP245, available from Air Products and Chemicals, Inc.) and the same amount of silicate binder of Aggregate 2. Aggregate 4 comprises 40% (by weight) Type I portland cement, 40% (by weight) of an oxidation product of this invention, and 20% (by weight) of Class F fly ash, treated with the latex and silicate binders described above. All binders and latex were mixed in.

Table 2a, below, compares the sulfate and magnesium extracted from the aggregates of Example 3 (Mix 1) with Aggregate 4 (Mix 2) of this example as determined after tumbling and by 24-hour Soxhlet extraction. (As mentioned above, the Soxhlet results are considered more representative of the weathering conditions under which the aggregate might be subjected, while the tumbling results would represent a worst-case scenario characterized by excessive abrasion and agitation.

TABLE 2a

Dependence on Cement Content of Asphalt Aggregate
Percent Reduction in Leachability of Mg and SO₄

| Aggre- | Mix 1 | | Mix 2 | | | |
| --- | --- | --- | --- | --- | --- | --- |
| | | | % Mg | % Mg | % SO₄ | % SO₄ |
| gate | % Mg | % SO₄ | Soxhlet | Tumbled | Soxhlet | Tumbled |
| 1 | 33.65 | 38.38 | 0.7 | 0.7 | 1.76 | 3.26 |
| 2 | 28.59 | 34.02 | 0.47 | 2.4 | 2.24 | 2.93 |
| 3 | 27.22 | 33.14 | 0.16 | 1.86 | 1.41 | 3.12 |
| 4 | 31.48 | 33.58 | <0.08 | <0.08 | 1.81 | 1.71 |

TABLE 2b

% Reduction over Mix 1 using Mix 2

| Aggregate | % Mg Soxhlet | % Mg Tumbled | % SO₃ Soxhlet | % SO₃ Tumbled |
| --- | --- | --- | --- | --- |
| 1 | 97.92 | 97.92 | 95.41 | 91.51 |
| 2 | 98.36 | 76.97 | 93.42 | 91.39 |
| 3 | 99.41 | 76.52 | 95.75 | 90.59 |
| 4 | 100 | 100 | 94.61 | 94.91 |

As can be observed from the results summarized in Tables 2a and 2b, increasing the cement concentration reduces both sulfate and magnesium leachability, irrespective of whether such aggregates are treated with binder. The incorporation of a Class F fly ash (Aggregate 4) further reduces sulfate and magnesium leachability, as compared to the Mix 1 aggregates of Example 3.

Consistent with the results of Example 3, Aggregate 4 of this example was treated with successive coatings of a commercially available hot mix asphalt material. A single coating of asphalt reduced the sulfate leached to 0.05 % of the sulfate present, and reduced the magnesium leached to 0.01% of the magnesium present.

Example 5

Similar composite materials in accordance with this invention are prepared in the manner described in the preceding Examples but employing a Class C fly ash in some specimens and a Class N pozzolan in other specimens in the formation of the cementitious material. The additive material used is $Na_2SiF_6$ along with a phenolic resin, such as phenol formaldehyde. The results obtained with these composites are similar to those shown in the previous Examples.

Similar results are obtained when employing potassium silicate as the additive material in concentrations from about 1 to about 4 per cent of the aggregate composite.

While the principles of this invention have been described in connection with specific embodiments, it should be understood clearly that these descriptions, along with the chosen tables and data therein, are made only by way of example and are not intended to limit the scope of this invention, in any manner. Other advantages and features of the invention will become apparent from the following claims, with the scope thereof determined by the reasonable equivalents, as understood by those skilled in the art.

What is claimed is:

1. An aggregate composite for hot mix asphalt, comprising:
  (a) a cementitious solid material including;
    (1) a cement present in the range from about 40 to about 99.9 percent by weight of the solid; and
    (2) a solid oxidation product of naturally occurring asphalt from the Orinoco Belt of Venezuela present in the range from about 0.1 to about 60 percent by weight of the solid, the cementitious material hydrated and formed into a porous nodule; and
  (b) an effective quantity of an additive material selected from the group consisting of an alkali silicate, an alkali fluosilicate, a latex emulsion (vinyl acetate) and a phenolic resin.

2. The composite of claim 1 wherein the oxidation product is an oxidation product of an aqueous emulsion of a naturally occurring asphalt from the Orinoco Belt of Venezuela.

3. The composite of claim 2 wherein the oxidation product is present in the range from about 35 to about 55 percent by weight.

4. The composite of claim 1 further including a mineral admixture present in the range from about 0.1 to about 30 percent by weight, and selected from the group consisting of Class F coal fly ash, Class C coal fly ash, Class N Natural Pozzolan and combinations thereof.

5. The composite of claim 4 wherein:
  the cement is a Type I portland cement present in the range from about 40 to about 50 percent by weight;
  the oxidation product is from the combustion of an aqueous emulsion of a naturally occurring asphalt from the Orinoco Belt of Venezuela present in the range from about 40 to about 60 percent by weight; and
  the fly ash material is a Class F coal fly ash present in the range from about 0.1 to about 20 percent by weight.

6. The composite of claim 5 wherein the additive material comprises an alkali silicate solution and an aqueous latex emulsion.

7. A manufactured aggregate, comprising:
  a cementitious solid material including a cement present in the range from about 40.0 to about 99.9 percent by weight of solids, and a solid oxidation product of an aqueous emulsion of a naturally occurring asphalt from the Orinoco Belt of Venezuela present in the range from about 0.1 to about 60 percent by weight of solids, the cementitious material hydrated and formed into a porous nodule; and
  calcium and magnesium silicate hydrates within the aggregate pores.

8. The aggregate of claim 7 wherein the oxidation product is an oxidation product of an aqueous emulsion of a naturally occurring asphalt from the Orinoco Belt of Venezuela.

9. The aggregate of claim 8 wherein the oxidation product is present in the range from about 35 to about 55 percent by weight.

10. The aggregate of claim 7 wherein the silicate hydrates are the reaction products of calcium and magnesium cations within the cementitious material and a sodium silicate.

11. The aggregate of claim 10 further including a binder selected from the group consisting of vinyl acetate, a latex emulsion and a phenolic resin.

12. The aggregate of claim 7 further including a fly ash material present in the range from about 0.1 to about 30 percent by weight, and selected from the group consisting of Class F coal fly ash, Class C coal fly ash, Class N Natural Pozzolan and combinations thereof.

13. The aggregate of claim 12 wherein:
  the cement is a Type I portland cement present in the range from about 40 to about 50 percent by weight;

the oxidation product is an oxidation product of an aqueous emulsion of a naturally occurring asphalt from the Orinoco Belt of Venezuela present in the range from about 40 to about 50 percent by weight; and the fly ash material is a Class F coal fly ash present in the range from about 0.1 to about 20 percent by weight.

14. The aggregate of claim 13 further including an emulsified latex binder.

15. The combination of claim 13 wherein the aggregate material further includes an emulsified latex binder.

16. In combination with a bituminous composition for construction of a pavement, a manufactured aggregate, comprising:

a cementitious solid material including a cement present in the range from about 40 to about 50 percent by weight of solids, and a solid oxidation product of an aqueous emulsion of naturally occurring bitumen from the Orinoco Belt of Venezuela present in the range from about 40 to about 50 percent by weight of solids;

a sodium silicate; and a Class F coal fly ash material present in the range from about 0.1 to about 20 percent by weight.

* * * * *